(12) United States Patent
Kaji

(10) Patent No.: US 6,997,763 B2
(45) Date of Patent: Feb. 14, 2006

(54) RUNNING CONTROL DEVICE

(75) Inventor: Hirotaka Kaji, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 98 days.

(21) Appl. No.: 10/273,776

(22) Filed: Oct. 17, 2002

(65) Prior Publication Data

US 2003/0077953 A1    Apr. 24, 2003

(30) Foreign Application Priority Data

Oct. 19, 2001    (JP) ............................. 2001-321545

(51) Int. Cl.
*B63H 21/21*    (2006.01)

(52) U.S. Cl. ................... 440/1; 440/84; 440/87

(58) Field of Classification Search .................... 440/1, 440/2, 53, 61, 84, 87, 61 R, 61 T; 701/21
See application file for complete search history.

(56) References Cited

U.S. PATENT DOCUMENTS

| | | | |
|---|---|---|---|
| 4,557,696 A | 12/1985 | Nakahama | |
| 4,565,528 A | 1/1986 | Nakase | |
| 4,631,035 A | 12/1986 | Nakahama | |
| 4,682,961 A | 7/1987 | Nakahama | |
| 4,695,260 A | 9/1987 | Suzuki et al. | |
| 4,702,714 A | 10/1987 | Nakase | |
| 4,718,872 A * | 1/1988 | Olson et al. | 440/1 |
| 4,759,733 A | 7/1988 | Nishimura | |
| 4,861,292 A * | 8/1989 | Griffiths et al. | 440/1 |
| 4,872,857 A * | 10/1989 | Newman et al. | 440/1 |
| 4,909,764 A * | 3/1990 | Hirukawa et al. | 440/1 |
| 4,931,025 A * | 6/1990 | Torigai et al. | 440/1 |
| 4,939,660 A * | 7/1990 | Newman et al. | 701/123 |
| 4,955,831 A * | 9/1990 | Inoue et al. | 440/1 |
| 4,998,521 A * | 3/1991 | Inoue et al. | 123/406.12 |
| 5,167,546 A | 12/1992 | Whipple | |
| 5,184,589 A * | 2/1993 | Nonaka | 123/352 |
| 5,203,727 A * | 4/1993 | Fukui | 440/1 |
| 5,366,393 A * | 11/1994 | Uenage et al. | 440/1 |
| 5,630,395 A * | 5/1997 | Katoh et al. | 123/406.44 |
| 5,785,562 A * | 7/1998 | Nestvall | 440/1 |
| 5,862,794 A * | 1/1999 | Yoshioka | 123/486 |
| 6,109,986 A * | 8/2000 | Gaynor et al. | 440/87 |
| 6,458,003 B1 * | 10/2002 | Krueger | 440/1 |
| 6,517,396 B1 * | 2/2003 | Into | 440/84 |
| 6,549,830 B1 * | 4/2003 | Harada et al. | 701/21 |

(Continued)

FOREIGN PATENT DOCUMENTS

GB        2396144 A    *    6/2004

(Continued)

*Primary Examiner*—S. Joseph Morano
*Assistant Examiner*—Ajay Vasudeva
(74) *Attorney, Agent, or Firm*—Knobbe, Martens, Olson & Bear, LLP

(57) ABSTRACT

A running control device for a watercraft controls propulsion force and tilt angle of a propulsion device relative to the hull of the watercraft. The running control device also sets an optimum trim angle automatically. The running control device includes a propulsion force control section that controls the propulsion force of the propulsion device. The running control device also includes a tilt angle control section that controls the tilt angle of the propulsion device. A target propulsion force calculation module responds to first input information (e.g., watercraft velocity) to calculate a target propulsion force. An amount-of-operation calculation module responds to second input information to calculate an amount of operation of the propulsion device to produce the target propulsion force. The tilt angle control section includes a tilt angle calculation module that determines the tilt angle based on the propulsion force.

23 Claims, 10 Drawing Sheets

U.S. PATENT DOCUMENTS

2001/0051476 A1   12/2001   Harada et al.
2002/0045958 A1    4/2002   Kamihira et al.
2003/0003822 A1 *  1/2003   Kaji ............................ 440/84

FOREIGN PATENT DOCUMENTS

| | | | | |
|---|---|---|---|---|
| JP | 53-093595 | 8/1978 | | |
| JP | 58-136594 | 8/1983 | | |
| JP | 60-022593 | 2/1985 | | |
| JP | 61-012498 | 1/1986 | | |
| JP | 61012498 A | * 1/1986 | | |
| JP | 63301196 A | * 12/1988 | .................... | 440/1 |
| WO | WO 02/36954 | 5/2002 | | |

* cited by examiner

RUNNING CONTROL DEVICE

PRIORITY INFORMATION

This application is based on and claims priority under 35 U.S.C. §119 to Japanese Patent Application No. 2001-321545 filed on Oct. 19, 2001, the entire contents of which are hereby expressly incorporated by reference herein.

BACKGROUND OF THE INVENTION

1. Field of the Invention

This application relates to running control devices for watercraft, and, more particularly, relates to running control devices to control an angle of a propulsion device relative to a hull of a watercraft.

2. Description of the Related Art

A small watercraft is propelled by a propulsion device, such as, for example, an outboard motor mounted on the stem of the hull of the watercraft. The outboard motor (or other propulsion device) includes a thrust generating element (e.g., a propeller) mounted on a lower portion of the outboard motor. The outboard motor is advantageously provided with a tilt angle adjusting device to enable adjustment of an angle of the outboard motor relative to a hull. The tilt angle adjusting device comprises, for example, a tilt cylinder and a trim cylinder. The outboard motor is rotated to a large extent by the tilt cylinder between a service position (e.g., an operating position) and a non-service position (e.g., a non-operating position). When the outboard motor is in the non-service position, the outboard motor is lifted so that the thrust-generating element is exposed above the water surface. When the outboard motor is in the service position, the thrust-generating element on the lower portion of the outboard motor is submerged in a body of water. When the outboard motor is in the service position, the trim angle of the outboard motor relative to the hull is adjusted by the trim cylinder. The trim angle is advantageously adjusted in response to variations in operating conditions when the outboard motor is propelling the watercraft.

Generally, when accelerating the small watercraft up to a maximum velocity, the device for adjusting the trim angle is adjusted in accordance with the running condition of the watercraft. For example, the trim is controlled to be full-trim-in (e.g., in a state of minimum trim angle) until the watercraft begins planing, and the trim is controlled to be full-trim-out (e.g., in a state of maximum trim angle) after the watercraft starts to plane. Since air resistance increases in the higher velocity range, the velocity of the watercraft can be increased after planing has started by decreasing the trim angle a small amount to lower the bow so that the forward projection area is decreased. Similarly, a more efficient fuel consumption may be effected by controlling the trim angle for a maximum velocity at a throttle opening less than wide-open throttle (WOT). In such cases, the trim angle should be adjusted to be appropriate in response to the output of the outboard motor, the shape of the hull, the position of the center of the gravity (e.g., based on the number and locations of passengers and the weight and locations of cargo), and the like. Typically, the watercraft operator adjusts the trim angle appropriately by hand whenever necessary; however, manual trim angle adjustment is very troublesome for the operator, even if the driver is a veteran (e.g., experienced) operator. Thus, automatic adjusting methods of the trim angle have been suggested. See, for example, JP-A-S61-12498 and U.S. Pat. No. 5,167,456.

Conventional trim angle automatic adjusting methods in which the trim angle is adjusted while throttle opening is kept constant, have problems. For example, velocity adjustment is difficult. Even if a driver adjusts the throttle opening to obtain a target velocity, adjustment of the trim angle causes increased velocity so that the throttle opening should be readjusted.

As another example, difficulties in turning may be caused when a trim angle is adjusted for a maximum velocity at a throttle opening. In particular, the trim angle is generally adjusted outwardly. If turning is performed in this condition, a noticeable velocity drop may occur. This increases the difficulty of controlling the throttle to maintain the planning state of the watercraft. In some cases, cavitation (e.g., a phenomenon of the propeller racing in the body of water) may occur, which could damage the outboard motor. Furthermore, after a turn is completed the throttle opening should be readjusted to maintain the desired watercraft velocity.

SUMMARY OF THE INVENTION

In view of the foregoing problems with known trim angle adjustment devices for watercraft, a need exists for a running control device capable of effecting easy running at a desired constant velocity and effecting stable running during turning without cavitation. A further need exists for a device for setting an optimum trim angle automatically.

One aspect of preferred embodiments described herein is a running control device in a watercraft having a propulsion device capable of controlling propulsion force and a tilt angle adjusting device capable of controlling an angle of the propulsion device. The running control device comprises a propulsion force control section that controls the propulsion force based on predetermined input information. The running control device also comprises a tilt angle control section that controls the tilt angle based on predetermined input information. The propulsion force control section comprises a target propulsion force calculation module that determines a target propulsion force based on predetermined input information. The predetermined input information includes, for example, the velocity of the watercraft. An amount-of-operation calculation module determines an amount of operation of the propulsion device based on predetermined input information in order to obtain the target propulsion force determined by the target propulsion force calculation module. The tilt angle control section comprises a tilt angle calculation module to determine the appropriate tilt angle for the target propulsion force.

In accordance with this aspect of the preferred embodiments, a target propulsion force is calculated automatically based on predetermined input information that includes velocity, and an amount of operation of the propulsion device is calculated based on predetermined information for the calculated target propulsion force. In addition, since an optimum tilt angle of the propulsion device relative to the hull is calculated based on information related to the propulsion force, an optimum propulsion force can be obtained at all times in response to the operating conditions. These features enable the watercraft to run at the optimum propulsion force as well as automatically running at an optimum trim angle for the operating conditions.

In accordance with this aspect of the preferred embodiments, the tilt angle calculation module allows the watercraft to run at an appropriate tilt angle of the propulsion unit in response to the velocity and also allows the watercraft to be operated at an efficient propulsion force. The target propulsion force calculation module and the amount-of-operation calculation module allow the watercraft to be operated at a constant velocity regardless of changes in weight or changes in the position of the center of gravity. Since the watercraft velocity is included as a parameter of the target propulsion force calculation, an excessive velocity drop caused by cavitation can be detected so that the propulsion force can be decreased to prevent further cavitation.

In accordance with this aspect of the preferred embodiments, running at an appropriate trim angle is achieved without requiring an operator to manually adjust the trim, regardless of the output of the outboard motor, the shape of the hull and the position of the center of gravity. Thus, the outboard motor is able to run at an efficient fuel consumption while propelling the watercraft at the target velocity. In addition, as a result of the velocity control, the watercraft is able to run at a desired velocity at all times, and turning can be performed easily without requiring manual operation of the throttle. If cavitation should start, the cavitation is suppressed promptly.

In accordance with particular aspects of the preferred embodiments, the propulsion device is an engine, and the running control device is provided with an engine output control section that controls the engine output based on at least one predetermined input. The engine output control section controls the output of the engine using at least one of an air intake control device that electrically controls the amount of intake air provided to the engine, an electronically controlled fuel injection device and an ignition control device. The engine output control section comprises a target engine speed calculation module that determines a target engine speed based on predetermined input information that includes at least information on the velocity of the watercraft. The engine output control section also includes an amount-of-operation calculation module that determines an amount of operation of the engine output control section based on predetermined input information such that the target engine speed determined by the target engine speed calculation module is obtained. The tilt angle calculation module determines the tilt angle based on predetermined input information that includes at least either the engine speed or the fuel consumption.

According to another particular aspect of the preferred embodiments, an engine is used as the propulsion device. The engine output is controlled using at least one of an air intake control device, such as a throttle valve, an electronically controlled fuel injection device, such as an electromagnetic fuel injection valve (injector), or an ignition control device, such as an ignition coil. A target engine speed is calculated based on input information that includes velocity information. An amount of operation of the engine output control is calculated based on predetermined input information so as to obtain the target engine speed. In addition, an optimum trim angle is calculated based on the engine speed, based on the fuel consumption, or based on the engine speed and the fuel consumption. The optimum trim angle is calculated in response to the operating conditions.

In accordance with this particular aspect of the preferred embodiments, engine speed may advantageously be used as a parameter of an evaluation value for determining the efficacy of the control. If so, the trim is adjusted to provide a trim angle corresponding to a minimum engine speed. Alternatively, fuel consumption may advantageously be used as a parameter of the evaluation value. If so, the trim is adjusted to provide a trim angle for a minimum fuel consumption. For example, the fuel consumption can be determined by monitoring a fuel flow meter mounted on a fuel pipe or by monitoring the duration of injection time of the fuel injector.

In accordance with another particular aspect of the preferred embodiments, the velocity of a watercraft is kept constant by the engine output control section, and the tilt angle calculation module is arranged to increase or decrease the tilt angle at predetermined control time intervals to minimize engine speed or to minimize fuel consumption.

According to a particular aspect of the preferred embodiments, the trim angle is adjusted while velocity is controlled to be constant, and control is performed for a minimum engine speed or a minimum fuel consumption, thereby causing the watercraft to be run at an optimum fuel consumption as well as at a desired velocity. In particular embodiments accordance to this aspect, the propulsion device is an outboard motor and the angle is a trim angle of the outboard motor. When the foregoing aspects of the preferred embodiments are applied to a trim adjustment control device of an outboard motor, the ease of producing appropriate trim adjustment when a watercraft is running at a constant velocity or providing engine control when the watercraft is turning is noticeably improved.

BRIEF DESCRIPTION OF THE DRAWINGS

Preferred embodiments in accordance with aspects of the present invention will be described below in connection with the accompanying drawing figures in which.

DETAILED DESCRIPTION OF THE PREFERRED EMBODIMENTS

Figure 1:
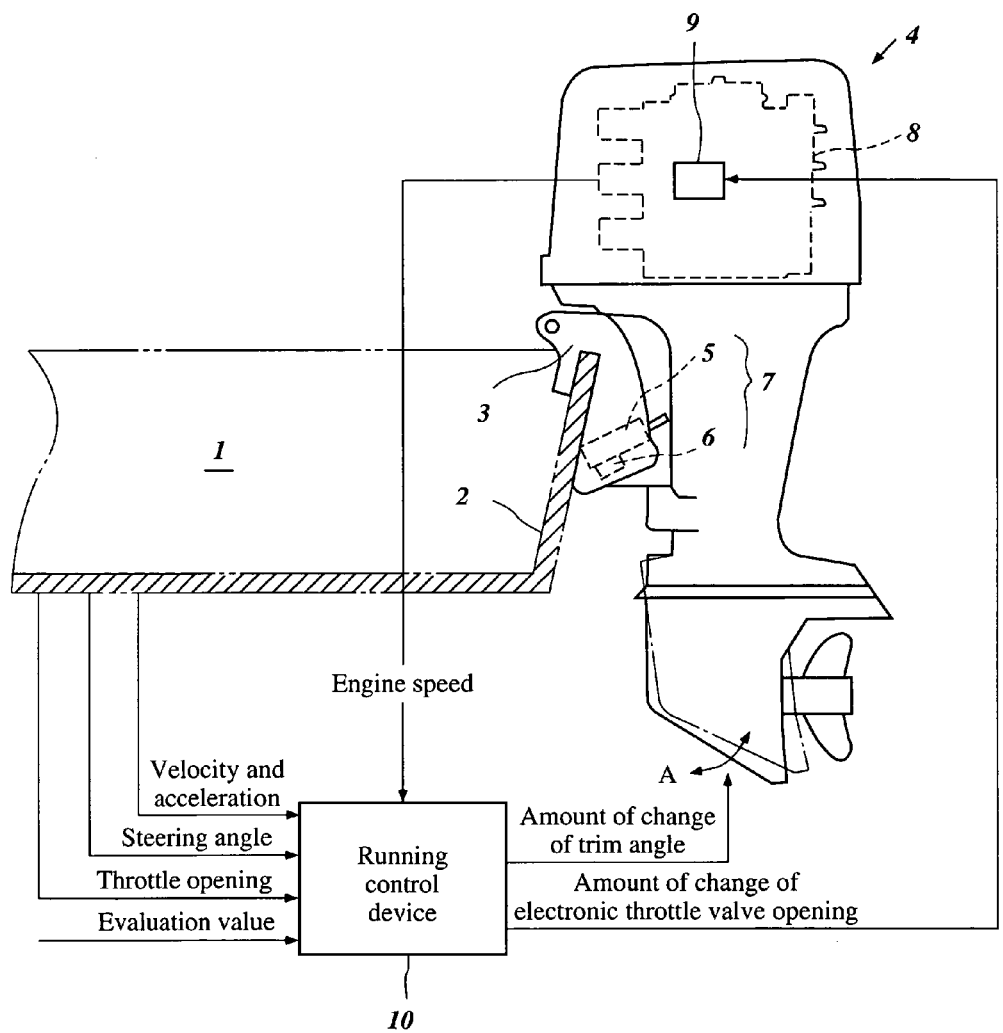
FIG. 1 illustrates a pictorial structural diagram of an outboard motor according to an embodiment of this invention.

FIG. 1 illustrates a structural diagram of a running control device according to an embodiment in accordance with aspects of the present invention. A propulsion device (e.g., an outboard motor) 4 is mounted to a transom plate 2 of a hull 1 through a clamping bracket 3. A trim adjusting device (e.g., a power trim device) 7 is mounted on the clamping bracket 3. The trim adjusting device 7 enables an angle of the outboard motor 4 relative to the hull 1 to be adjusted in the direction of an arrow A. The trim adjusting device 7 comprises an oil cylinder 5 and a hydraulic pump 6.

The outboard motor 4 includes an engine 8 having an intake pipe (not shown). An electronic throttle valve 9 is mounted in the intake pipe and is connected to a running control device 10. Information on velocity and acceleration, information on steering angle, and information on throttle opening and engine speed are provided as inputs to the running control device 10 from sensors (not shown) mounted on the watercraft hull 1 and on the motor 4. In addition, information on fuel consumption is inputted to the running control device 10 as an evaluation value of the efficacy of the drive control 10. The running control device 10 responds to the inputted information and calculates an amount of change of the opening of the electronic throttle valve 9 to perform velocity control according to a target velocity as described below. In addition, the running control device calculates an amount of change of the trim angle to drive the trim adjusting device 7 to position the outboard motor at an optimum trim angle.

Figure 2:
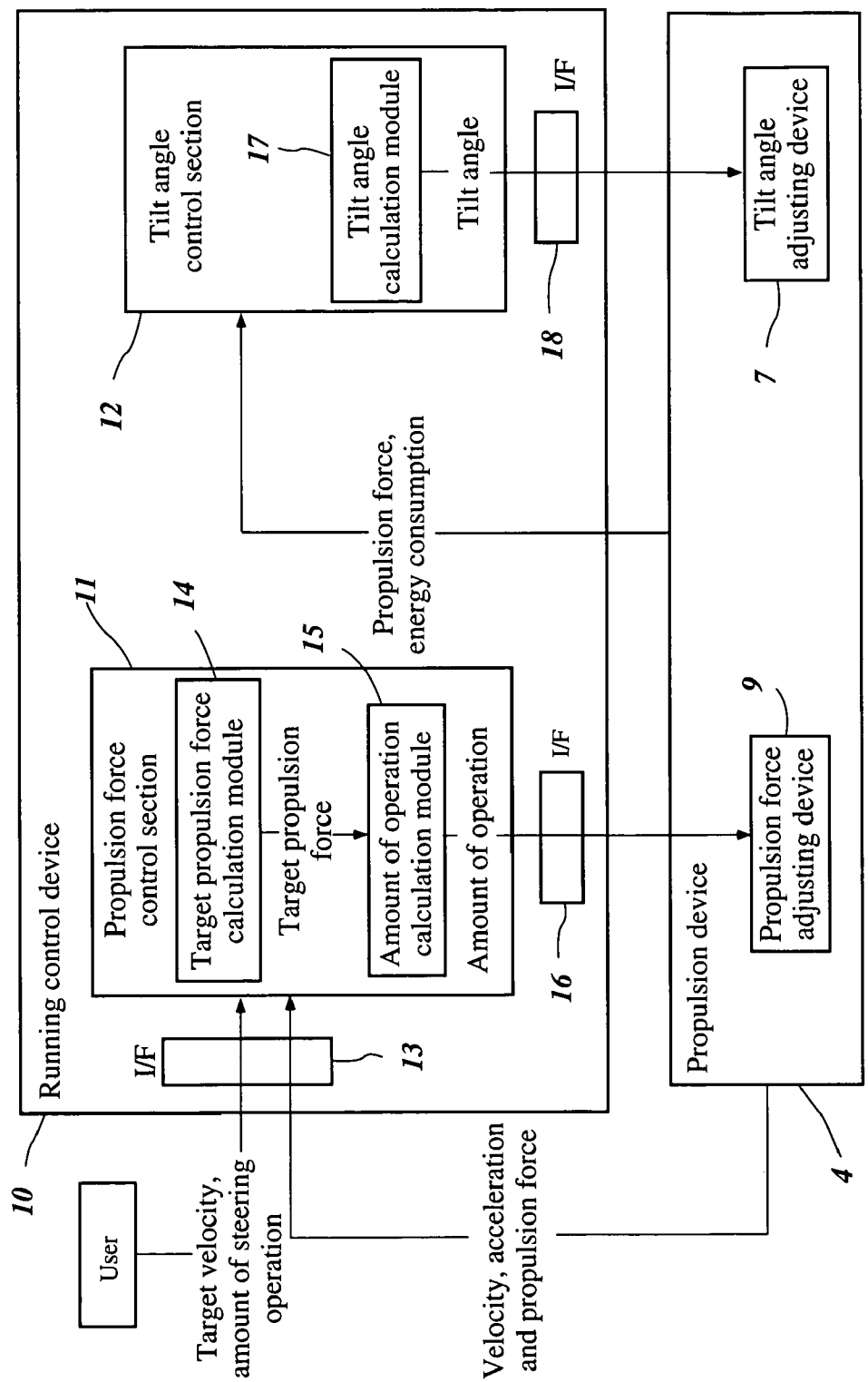
FIG. 2 illustrates a basic block diagram of a running control device according to this invention.

FIG. 2 illustrates a block diagram of the running control device 10 of FIG. 1 in combination with the propulsion device (e.g., a motor) 4. The propulsion device 4 is able to control propulsion force through the propulsion force adjusting device (e.g., the throttle valve) 9. The propulsion device 4 is provided with the tilt angle adjusting device 7.

The running control device 10 comprises a propulsion force control section 11 and a tilt angle control section 12. A user (e.g., a watercraft operator or driver) manually inputs information representing a target velocity to the propulsion force control section 11 (e.g., by manipulating a velocity adjustment lever (not shown) or the like). The user also inputs information to the propulsion control section 11 representing a steering operation to perform by operating a steering control device (e.g., by turning a steering wheel). Information regarding velocity and acceleration as well as information regarding propulsion force (e.g., engine speed) are provided to the propulsion force control section 11 from the propulsion device 9 via an interface 13.

The propulsion force control section 11 includes a target propulsion force calculation module 14 and an amount-of-operation calculation module 15. The target propulsion force calculation module 14 calculates a target propulsion force based on the inputted information. The amount-of-operation calculation module 15 responds to the output of the target propulsion force calculation module 14 and calculates an amount of operation of the propulsion force adjusting device needed to achieve the calculated target propulsion force. The amount of operation calculated by the amount-of-operation calculation module 15 is provided to an interface 16, which applies a control signal to the propulsion force adjusting device 9 responsive to the amount of operation.

The tilt angle control section 12 includes a tilt angle calculation module 17 that calculates an appropriate tilt angle of the propulsion device 4 based on information regarding the propulsion force and information regarding energy consumption (e.g., fuel consumption) from the propulsion device 4. The tilt angle adjusting device 7 receives a control signal based on the calculated tilt angle via an interface 18.

Figure 3:
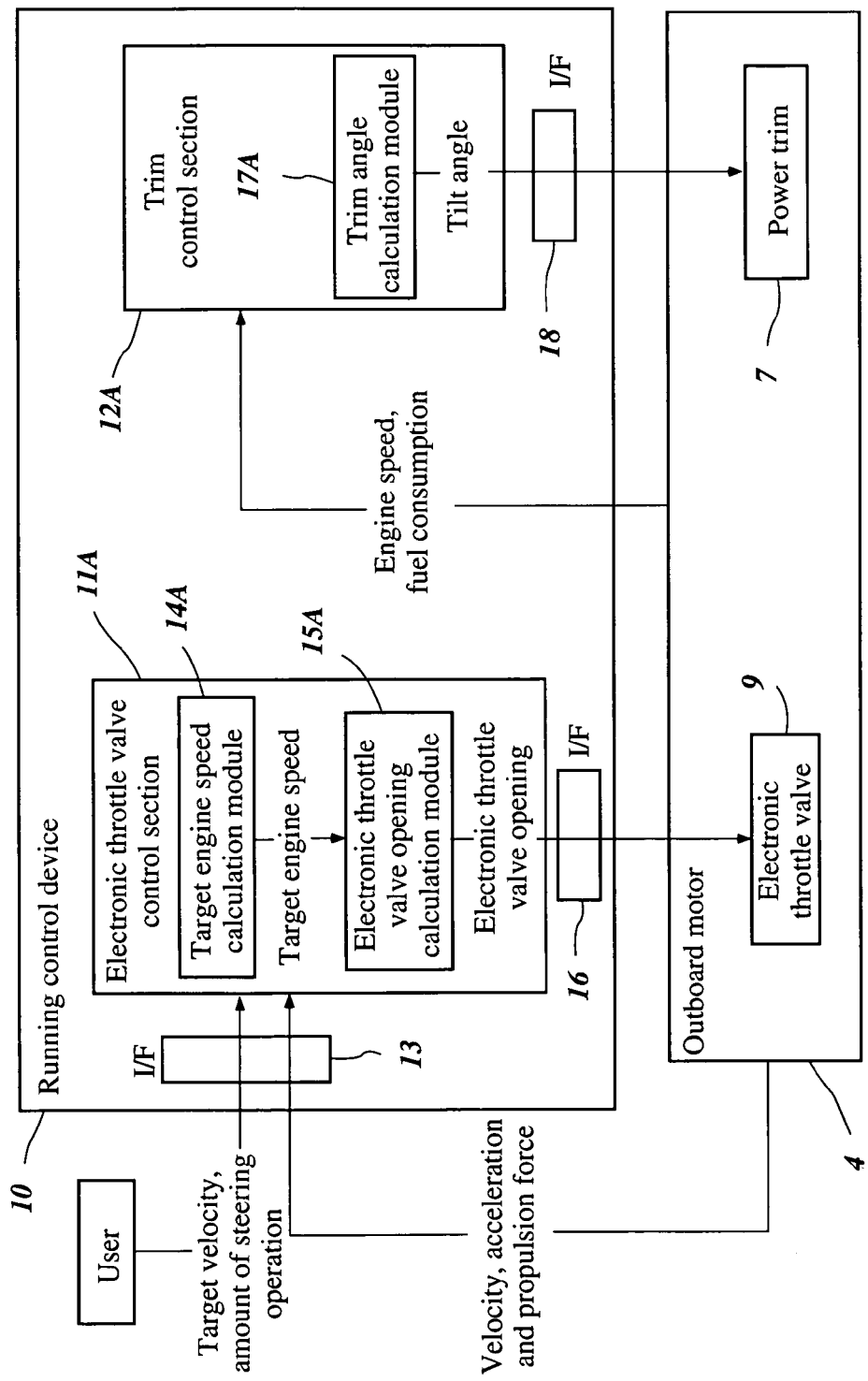
FIG. 3 illustrates a detailed block diagram of a particular embodiment of the running control device of FIG. 2.

FIG. 3 illustrates a block diagram of a specific embodiment of the running control device of FIG. 2. In FIG. 3, the propulsion device is an outboard motor 4, the propulsion force adjusting device is an electronic throttle valve 9, and the tilt angle adjusting device is a power trim 7. In FIG. 3, the propulsion force control section 11 comprises an electronic throttle valve control section 11A, which includes a target engine speed calculation module 14A and an electronic throttle valve calculation module 15A. The target engine speed calculation module 14A calculates a target engine speed based information regarding a target velocity, an amount of steering operation, watercraft velocity and acceleration, and engine speed. The electronic throttle valve calculation module 15A calculates an electronic throttle valve opening value to achieve the target engine speed. The opening of the electronic throttle valve 9 is controlled based on the calculated valve opening value via the interface 16.

In FIG. 3, a trim control section 12A corresponds to the tilt angle control section 12 of FIG. 2. A trim angle calculation module 17A in the trim control section 12A calculates an optimum tilt angle (trim angle) based on information on engine speed and fuel consumption. The power trim 7 receives a control signal based on the calculated trim angle via the interface 18 and responds to the control signal to adjust the trim angle of the outboard motor 4.

Figure 4:
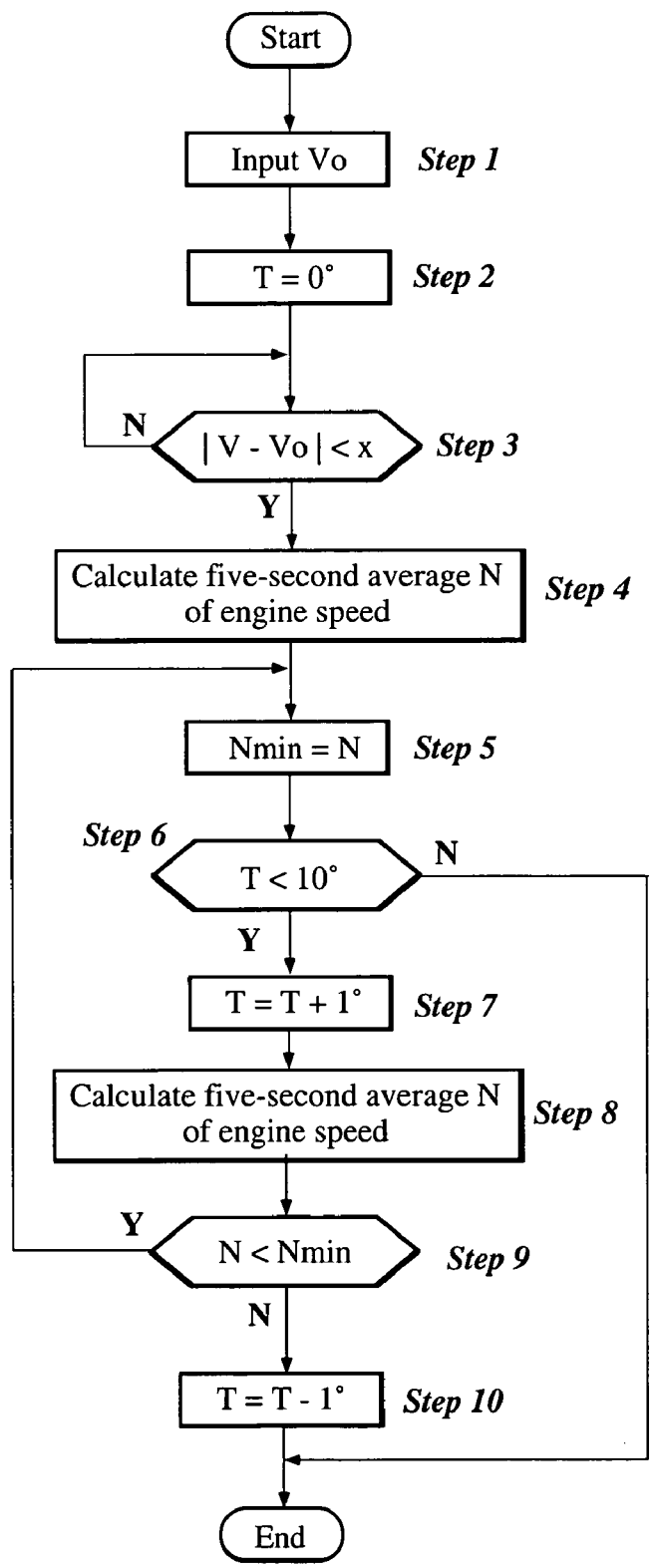
FIG. 4 illustrates a flowchart showing operations of the running control device of FIG. 3.

FIG. 4 illustrates a flowchart of the trim angle setting control operation of the running control device in accordance with preferred embodiments. In a step 1, the running control device inputs a target velocity $V_0$ (e.g., 40 km/h). The control operation advances to a step 2, wherein acceleration is initiated by a manual throttling operation (e.g., via manual adjustment of a throttle lever or the like) with the initial trim angle T set to 0°.

The control operation advances to a step 3, wherein the watercraft is accelerated in response to the throttling operation, and wherein the running control device determines whether or not the absolute value of the difference between a five-second average velocity V and the target velocity $V_0$ is smaller than a given value x (e.g., 2 km/h). As indicated by the loop back to the step 3, the acceleration is continued until the absolute value of the difference is smaller than the given value x. After the given value x is reached, the control operation advances to a step 4 to start automatic running control.

In the step 4, the running control device calculates a five-second average engine speed N with the trim angle at the initial trim angle (e.g., with T=0°). The control operation advances to a step 5, wherein the running control device sets the average engine speed N calculated in the step 4 to Nmin.

The control operation advances to a step 6, wherein the running control device determines whether the trim angle T is less than 10°. In the illustrated embodiment, the maximum trim angle in the trim angle setting control is 10°, and if the trim angle is smaller than 10°, the control operation advances to a step 7 to increase the trim angle. If the trim angle T is at least 10°, the trim angle setting control operation bypasses the remaining steps and ends. It should be understood that although the maximum trim angle 10° is set as an upper limit in the trim angle setting control of the illustrated embodiment, the trim angle is advantageously adjustable to an angle greater than 10° in alternative embodiments.

In the step 7, which is executed if the trim angle is smaller than 10°, the running control device adds 1° to the current trim angle T (e.g., T=T+1°). Incrementing the trim angle by 1° causes the bow of the watercraft to be raised a small amount to decrease the resistance of the watercraft as it moves through the water. In the illustrated embodiment, constant velocity running control is performed. Thus, when the water resistance decreases, the throttle is automatically operated to lower the engine speed to maintain the desired constant velocity.

The control operation advances to a step 8 after the trim angle increased by 1°. In the step 8, the running control device calculates the five-second average engine speed N at the new trim angle and the control operation then advances to a step 9. In the step 9, the current five-second average speed N caused by the increased trim angle is compared with the five-second average value Nmin calculated at the initial trim angle (e.g., at T=0°). If N is less than Nmin in the step 9, a further increase of the trim angle can be considered, and the control operation returns to the step 5 to repeat the foregoing operations until the trim angle T reaches 10°. If N is at least as great as Nmin in the step 9, the control operation advances to a step 10.

In the step 10, which is performed if the calculated value of the engine speed N is at least as great as Nmin, the trim angle T is decreased by 1° from the current value of the trim angle to reduce the engine speed. In particular, when the trim angle is increased gradually in the step 9, the bow is raised gradually, which decreases water resistance; however, if the bow is raised excessively, air resistance increases. In response to the increased air resistance, throttle control is performed to increase the engine speed in order to maintain a constant running velocity of the watercraft. Therefore, if N becomes at least as great as Nmin, the control operation sets the trim angle T to the current trim angle minus 1° as an optimum trim angle. After adjusting the trim angle, the control operation ends. The foregoing operations are repeated to maintain the watercraft at a constant running velocity in response to varying conditions encountered by the watercraft.

Figure 5:
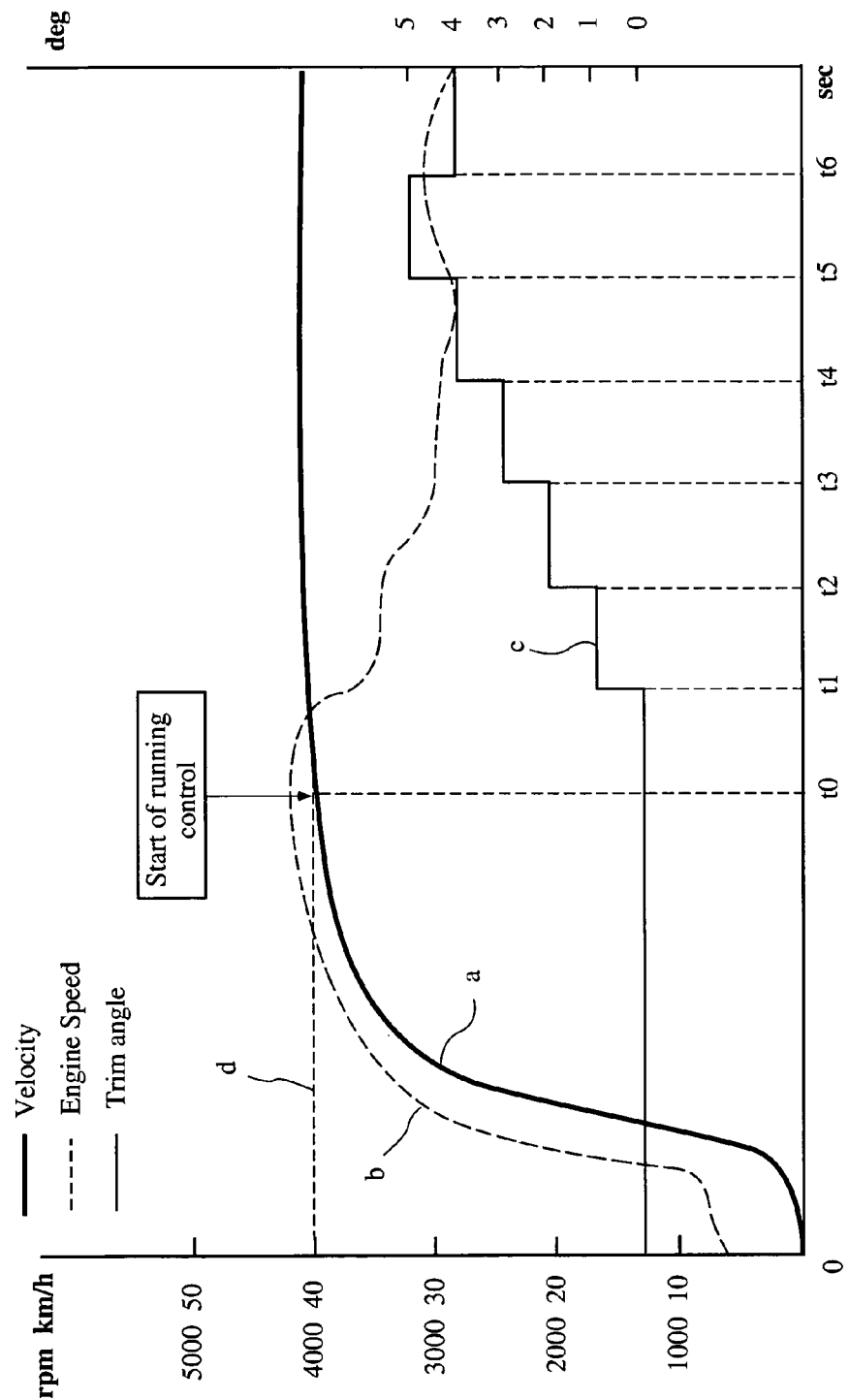
FIG. 5 illustrates a time chart of the operations of FIG. 4.

FIG. 5 illustrates a graph of a preferred exemplary control operation performed by the illustrated embodiments of the running control device. In FIG. 5, the horizontal axis represents time and the vertical axis represents magnitudes of engine speed (rpm), watercraft velocity (km/h) and trim angle (deg). In particular, a solid curve "a" represents watercraft velocity as a function of time, a dashed curve "b" represents engine speed as a function of time, a set "c" of horizontal lines represents a trim angle during time intervals, and a dashed horizontal line "d" represents a target velocity.

When the watercraft velocity "a" approaches the target velocity "d" and the difference between the two values becomes smaller than, for example, 2 km/h, the running control of the step 3 in FIG. 4 is initiated at a running starting time designated as t0. The control operation calculates an initial average engine speed N for an interval of five seconds from the running starting time t0 to a time t1 in accordance with the step 4 of FIG. 4. During subsequent 5-second time intervals beginning from the time t1 to a time t2, from the time t2 to a time t3, from the time t3 to a time t4, and so on, the control operation calculates the average engine speed N while increasing the trim angle T by 1° for each subsequent time interval in accordance with the steps 5–9 of FIG. 4.

In accordance with the control operation of FIGS. 4 and 5, drive control is performed such that the velocity is maintained constant as described below. For example, when the engine speed or the fuel consumption is taken as an evaluation value of the control, the engine is driven to obtain minimum evaluation values such that a constant velocity is maintained with a maximum operation efficiency. Therefore, as illustrated by the set "c" of horizontal line segments, as the trim angle T is increased by 1° stepwise during each five-second interval, the engine speed b decreases gradually until a time t5. In the illustrated example, the engine speed increases during the interval from the time t5 to a time t6 after the trim angle T is increased to 5°. Therefore, as described above in connection with the step 9 and the step 10 of FIG. 4, the control of the trim angle setting is completed after reducing the trim angle to an optimum trim angle of 4° (e.g., the current trim angle of 5° minus 1°), and the constant velocity control is continued at the optimum trim angle.

FIGS. 6–10 illustrate constant velocity control in a running control device in accordance with preferred embodiments of the present invention.

Figure 6:
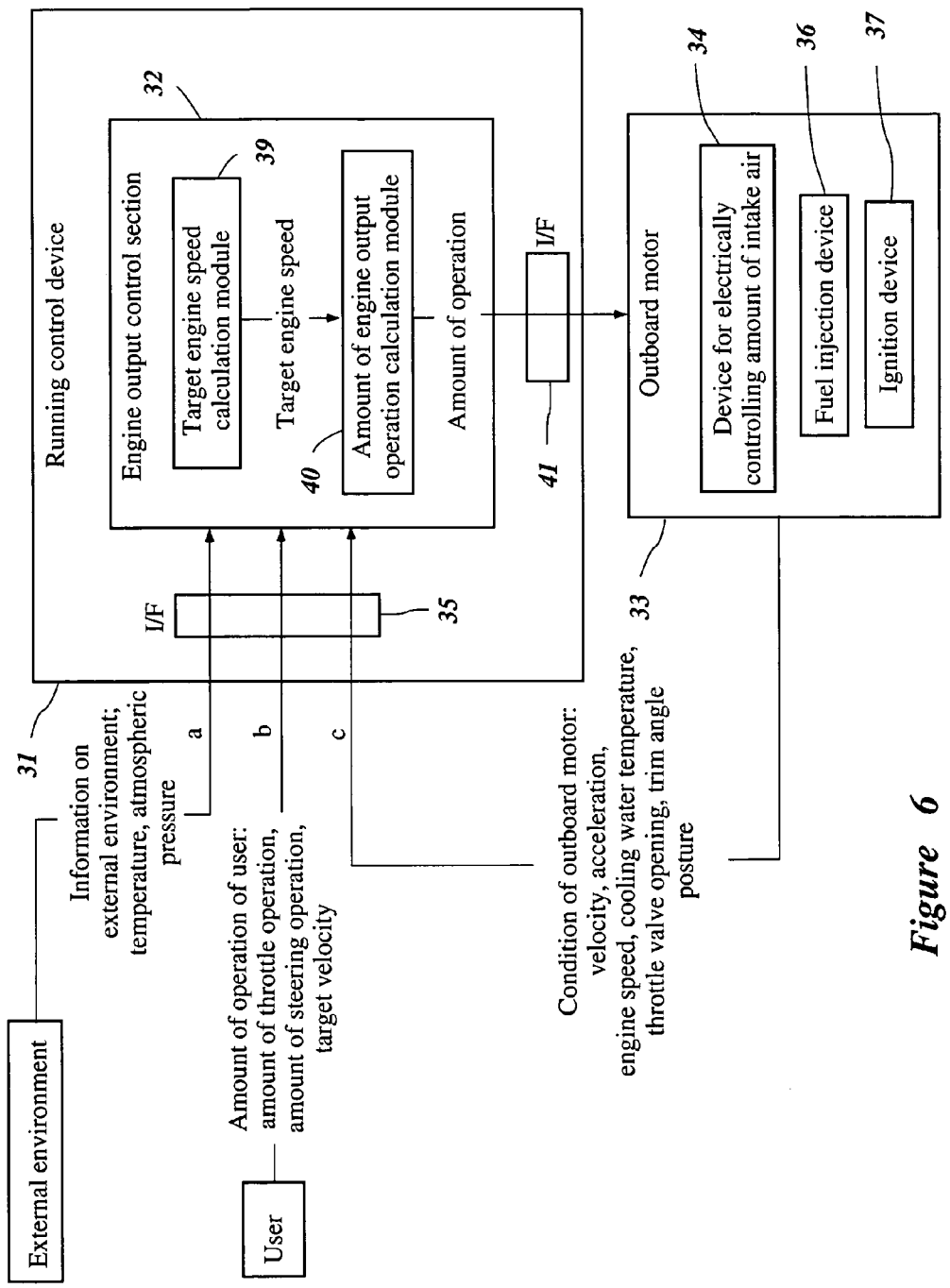
FIG. 6 illustrates a block diagram of a running control device for constant velocity control according to this invention.

FIG. 6 illustrates a block diagram of a running control device 31 according to an embodiment implemented, for example, in a small watercraft having an outboard motor 33. The running control device 31 comprises an engine output control section 32, which is advantageously located on a hull of a watercraft (not shown). The engine output control section 32 outputs drive signals to electrically control an air intake control device 34 on the outboard motor 33 to thereby control an amount of intake air. For example, the air intake control device advantageously comprises an electronic throttle valve. The drive signals from the output control section 32 also control other devices related to engine output such as, for example, a fuel injection device 36 and an ignition device 37. An external environment information signal "a," a user's amount-of-operation information signal "b" and a condition-of-outboard motor information signal "c" are inputted to the running control device 31 via an interface 35 (input section). Each of the illustrated signals advantageously represents a plurality of signals. The external environment information advantageously includes detected information on atmospheric temperature or atmospheric pressure. The user's amount-of-operation information includes, for example, an amount of throttling operation, an amount of steering operation and a target velocity input. The condition-of-outboard motor information includes, for example, watercraft velocity, watercraft acceleration, engine speed, cooling water temperature, throttle opening, trim angle and posture (e.g., operational attitudes) of the watercraft.

The engine output control section 32 comprises a target engine speed calculation module 39 and an amount-of-engine output operation calculation module 40. The target engine speed calculation module 39 determines a target engine speed based on predetermined input information. The amount-of-engine output operation calculation module 40 determines an amount of operation of the air intake control device 34 such that engine speed follows the target engine speed. The amount-of-engine output operation calculation module 40 further calculates an amount of fuel injection provided by the fuel injection device 36 and calculates an ignition timing provided by the ignition device 37 to maintain the target engine speed in order to determine an amount of driving operation. At this time, a trim angle by a trim driving device (not shown in FIG. 6) may be calculated to determine the amount of driving operation. Driving devices such as the air intake control device 34 and the fuel injection device 36 of the outboard motor 33 are driven via an interface 41 (output section) to achieve the target engine speed based on the amount of operation of the air intake control device 34 or the like determined from the calculation of the amount-of-engine output operation calculation module 40.

The target engine speed calculation module 39 is arranged to calculate a target engine speed to achieve a constant watercraft velocity, for example. Accordingly, the amount-of-engine output operation calculation module 40 calculates the amount of operation of the air intake control device 34 at which the actual engine speed follows the target engine speed in order to drive the amount-of-intake air control device 34. Therefore, automatic running of the watercraft at a constant velocity can be achieved without requiring the user (e.g., an operator or driver) to operate a throttle lever to control the air intake control device (e.g., the electronic throttle valve) 34.

If the engine speed increases noticeably above a target engine speed in the event of cavitation of the thrust generating portion (e.g., the propeller) of the propulsion device, the amount-of-engine output operation calculation module 40 drives the air intake control device 34 in a direction to decrease the amount of intake air, thereby reducing the engine speed and suppressing the cavitation promptly.

Figure 7:
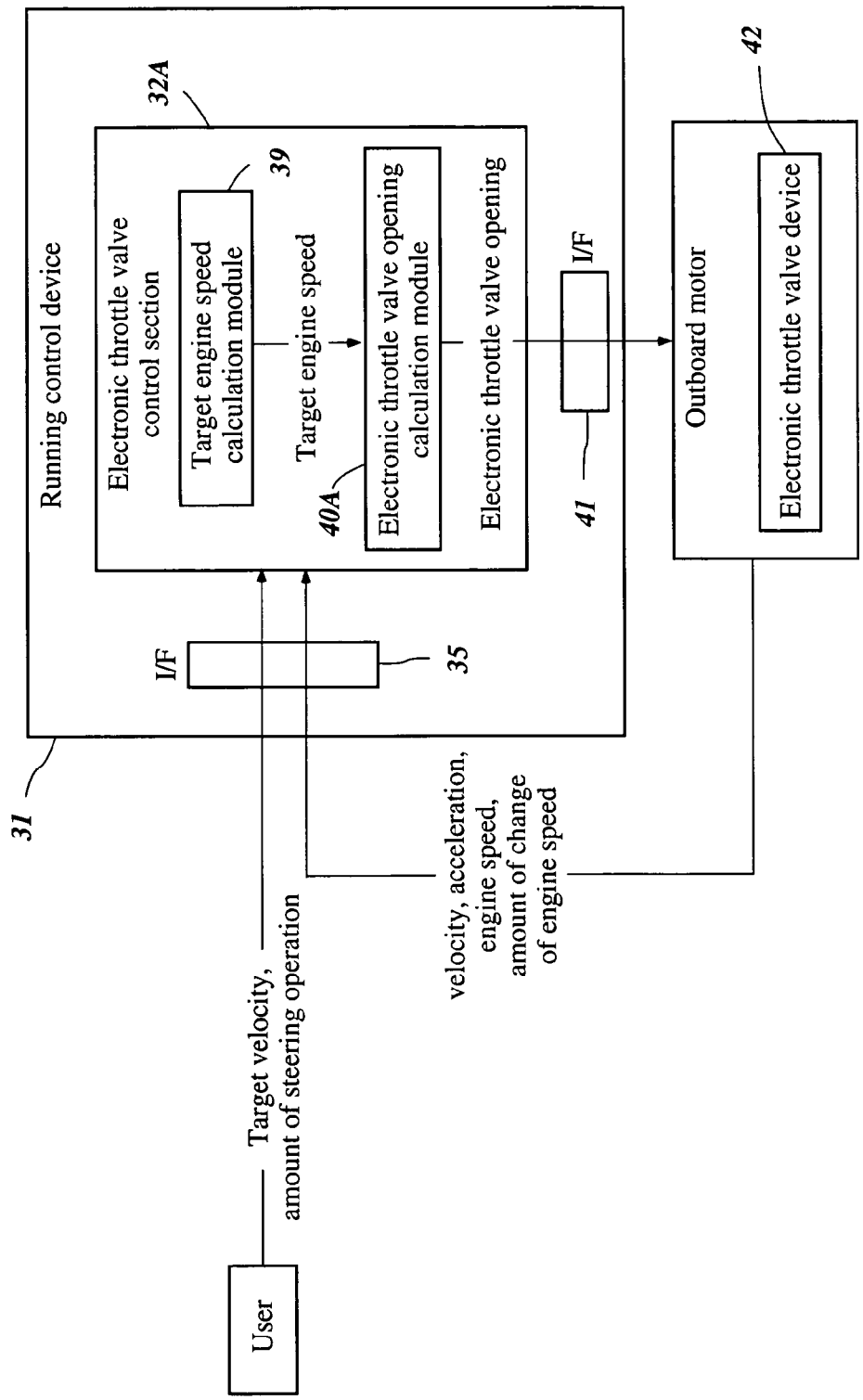
FIG. 7 illustrates a block diagram of a particular embodiment of the running control device of FIG. 6.

FIG. 7 is a block diagram a preferred embodiment of the running control device of FIG. 6. In FIG. 7, the running control device 31 includes an electronic throttle valve control section 32A that corresponds to the engine output control section 32 of FIG. 6. The electronic throttle valve control section 32A includes the target engine speed calculation module 39 and an electronic throttle valve opening calculation module 40A. The target engine speed calculation module 39 calculates a target engine speed in response to input information of the target velocity from a user. The electronic throttle valve opening calculation module 40A corresponds to the amount-of-engine output operation calculation module 40 of FIG. 6 and calculates an electronic throttle valve opening at which the actual engine obtains the calculated target engine speed. The electronic throttle valve opening calculation module 40A drives the electronic throttle valve 42 at the amount of operation required for the calculated electronic throttle valve opening. Therefore, an amount of intake air for a target engine speed is supplied, and the engine output is obtained for running the watercraft at a target velocity so as to provide an automatic cruising control at a constant velocity.

Figure 8:
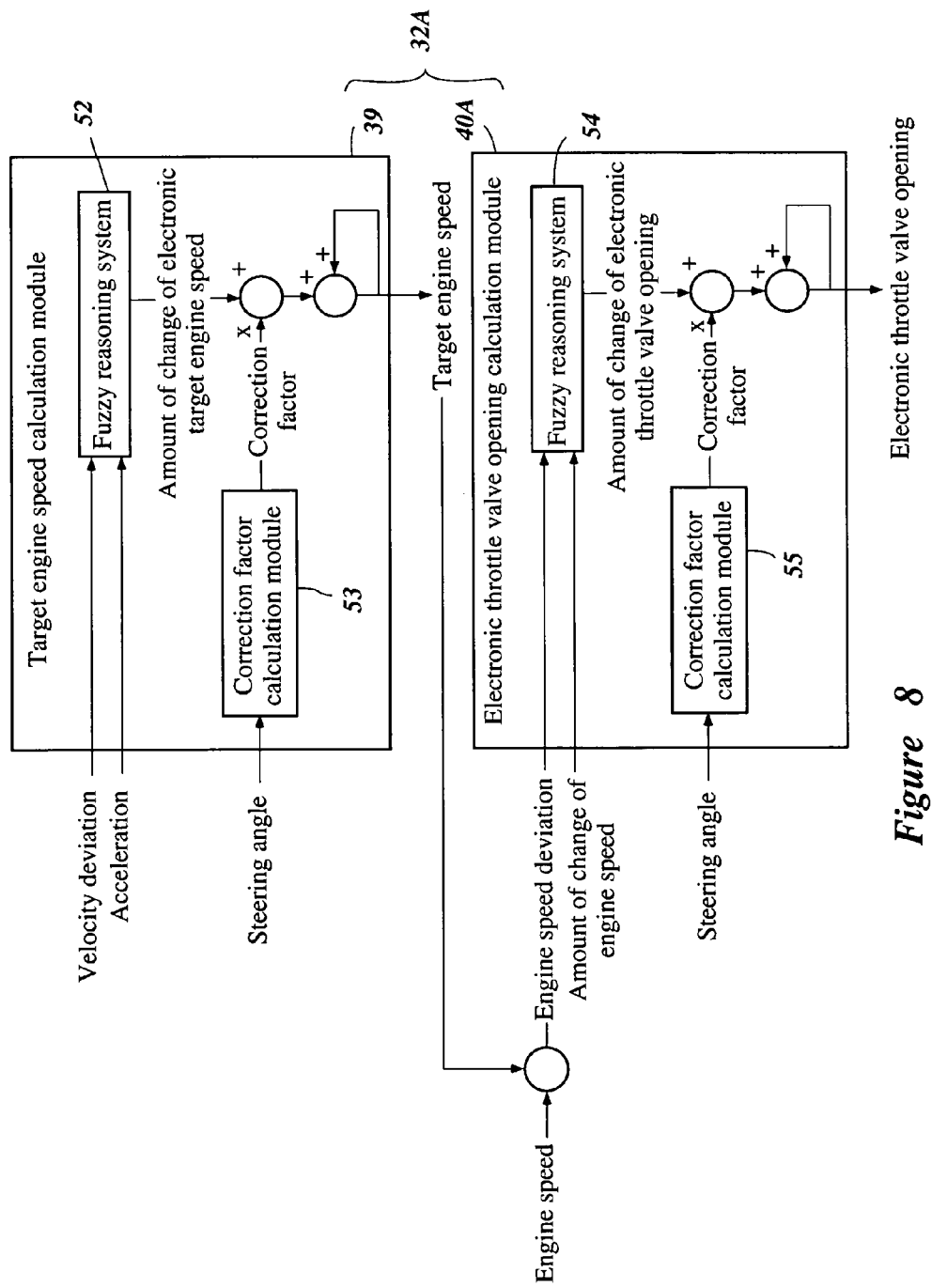
FIG. 8 illustrates a block diagram of the electronic throttle valve control section of the running control device of FIG. 7.

FIG. 8 is a block diagram of the electronic throttle valve control section 32A of FIG. 7. The target engine speed calculation module 39 is provided with a fuzzy reasoning system (e.g., a fuzzy logic system) 52 that implements a fuzzy rule to calculate an amount of change of the target engine speed based on the velocity deviation and acceleration. A correction factor calculation module 53 is responsive to the steering angle to calculate a correction factor to the amount of change of the target engine speed calculated by the fuzzy reasoning system 52. The correction factor calculation module 53 multiplies the correction factor by the forgoing amount of change of the target engine speed to obtain target engine speed data.

An engine speed deviation is determined from the difference between the target engine speed data and actual engine speed data. The engine speed deviation data and the data of the amount of change of the target engine speed are inputted to a fuzzy reasoning system 54 in the electronic throttle valve opening calculation module 40A. The fuzzy reasoning system 54 calculates an amount of change of the electronic throttle valve opening based on the fuzzy input data. A correction factor calculation module 55 is responsive to the steering angle to calculate a correction factor to the calculated data of the amount of change of the electronic throttle valve opening. The correction factor calculation module 55 multiplies the correction factor by the foregoing amount of change of the electronic throttle valve opening to obtain electronic throttle valve opening data.

Figure 9:
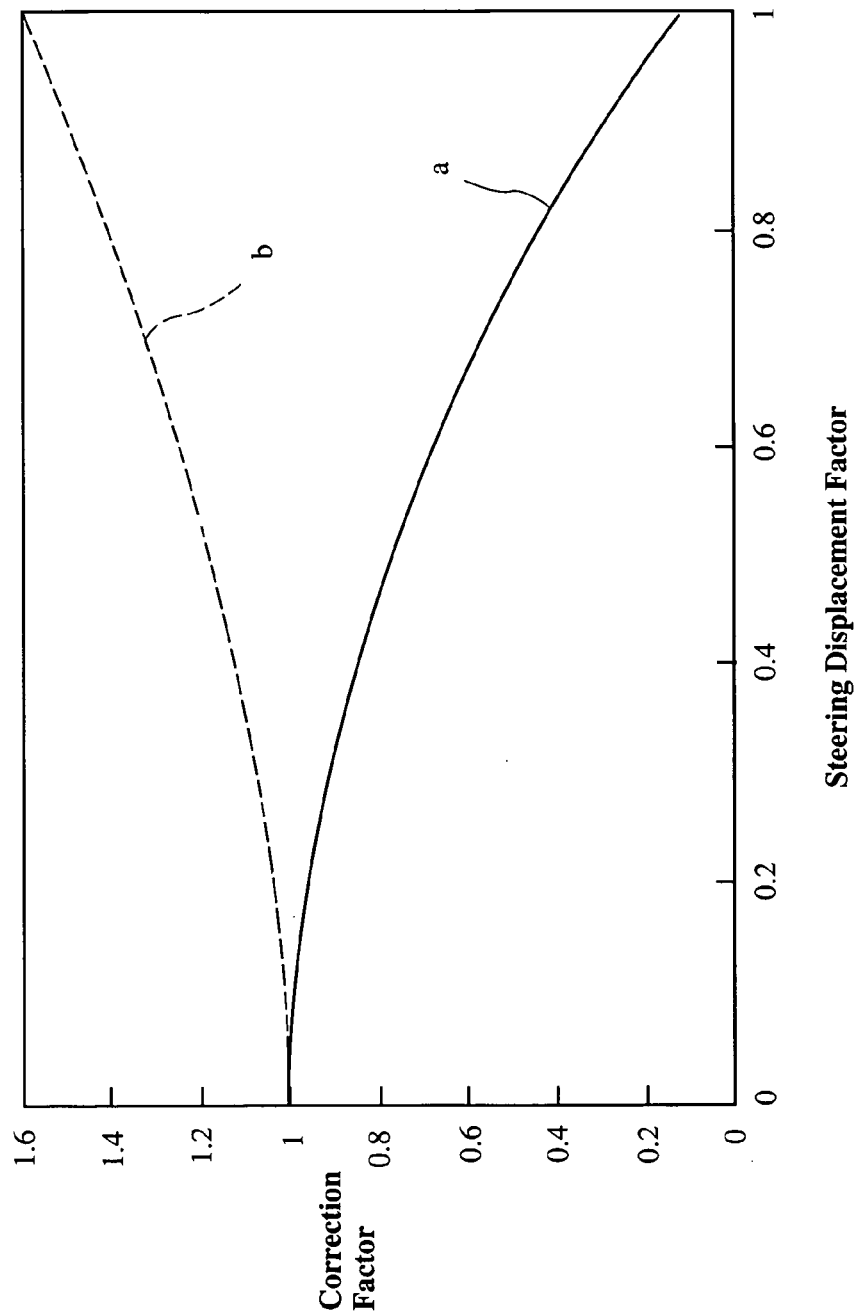
FIG. 9 illustrates a graph of the correction factor based on the steering angle.

FIG. 9 illustrates a graph of the correction factor. The horizontal axis of the graph represents the steering displacement factor, wherein 0 corresponds to a neutral steering position and 1 corresponds to a position of a maximum steering angle. The vertical axis represents a magnitude of the correction factor.

In FIG. 9, a solid curve "a" represents the correction factor used by the correction factor calculation module 53 in the target engine speed calculation module 39 of FIG. 7. The correction factor represented by the solid curve "a" is smaller than 1 and becomes smaller for larger steering angles.

In FIG. 9, a dashed curve "b" represents the correction factor used by the correction factor calculation module 55 in the electronic throttle valve opening calculation module 40A of FIG. 7. The correction factor represented by the dashed curve "b" is larger than 1 and becomes larger for larger steering angles.

Figure 10:
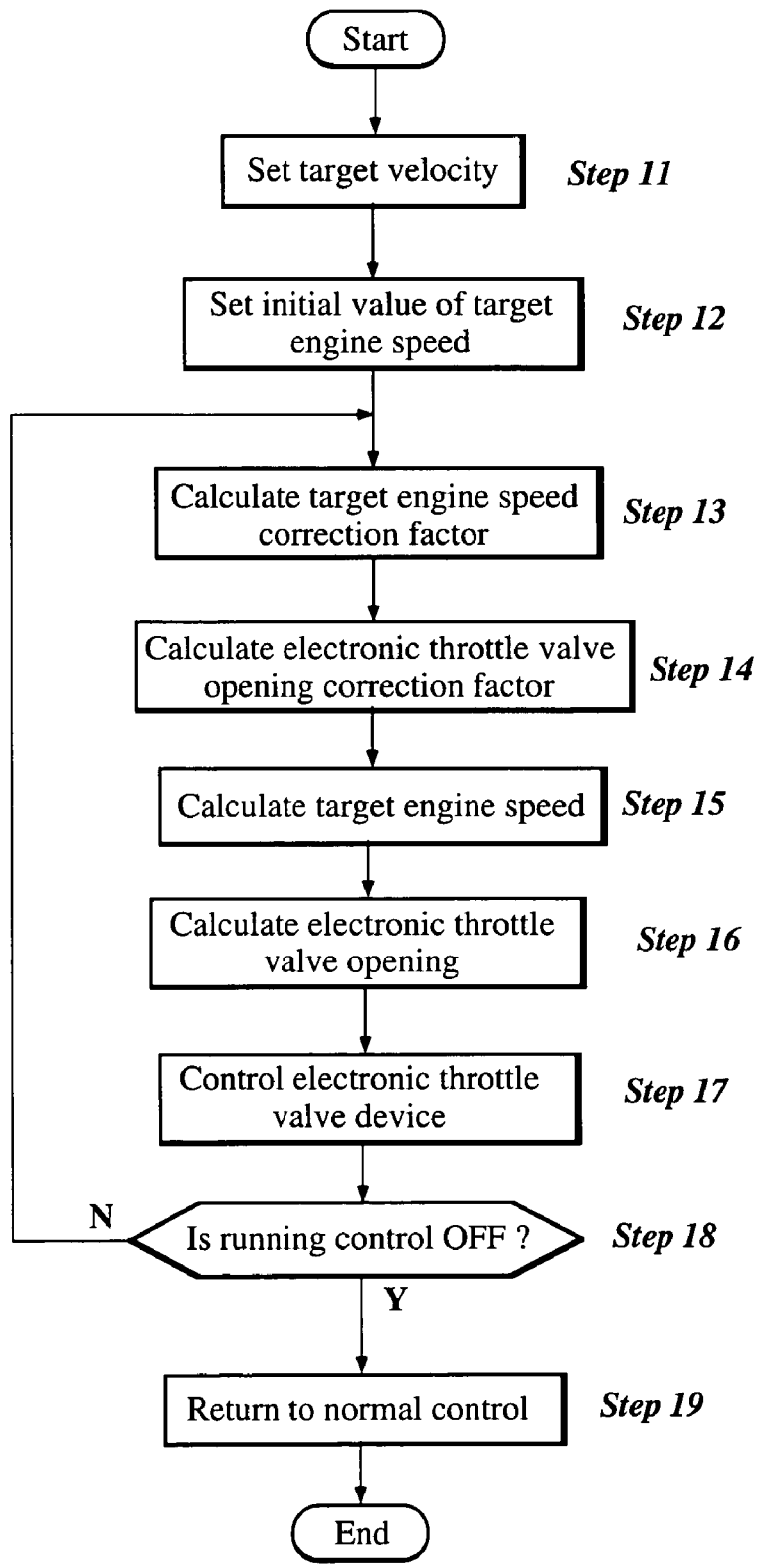
FIG. 10 illustrates a flowchart of control operations in the electronic throttle valve control section of FIG. 8.

FIG. 10 illustrates a flowchart of a running control operation performed by the running control device. In a step 11, the user sets a target velocity. The target velocity may advantageously be any value specified by the user, or, alternatively, the target velocity may be selected from among a plurality of values provided by the manufacturer of the running control device, by the manufacturer of the watercraft, or by the manufacturer of the motor.

The running control operation advances to a step 12, the running control operation sets an initial value of a target engine speed. If the current velocity is close to the target velocity, the current target engine speed is set as an initial value of the target engine speed. If the current velocity is not close to the target velocity, a predetermined target engine speed is used as the initial value. The initial value of the target engine speed may advantageously be any value specified by the user, or, alternatively, the target velocity may be selected from among a plurality of values provided by the manufacturer of the running control device, by the manufacturer of the watercraft, or by the manufacturer of the motor. Using the initial values as references, the running control operation performs feedback control based on the difference from the measured current engine speed such that engine speed follows the target engine speed.

The running control operation advances to a step 13, wherein the running control operation calculates a correction factor of the target engine speed based on the steering angle as described above, according to the solid curve "a" of FIG. 9. Then, in a step 14, the running control operation calculates a correction factor of the electronic throttle valve opening according to the dashed curve "b" of FIG. 9.

The running control operation advances to a step 15, wherein the running control operation calculates a target engine speed. In a step 16, the running control operation calculates an electronic throttle valve opening using the correction factors.

The running control operation advances to a step 17, wherein the running control operation operates the electronic throttle valve based on the calculated data of the electronic throttle valve opening. Then, in a step 18, the running control operation determines whether the operation is in an automatic control mode according to the running control program. If the running control operation is operating in automatic control mode, the running control operation repeats the steps 13–17. When the automatic control mode is cancelled, the running control operation advances to the step 19 and returns to an ordinary operating mode.

As described above, a target propulsion force is calculated automatically based on predetermined input information, which includes watercraft velocity. An amount of operation of the propulsion device to achieve the calculated target propulsion force is calculated based on predetermined information. In addition, since an optimum tilt angle of the propulsion device relative to the hull is calculated based on information (e.g., velocity and engine speed) responsive to the propulsion force, an optimum propulsion force can be obtained at all times in response to the operating conditions to thereby enable operation of the watercraft with the optimum propulsion force as well as to enable automatic operation at an optimum trim angle for the operating conditions.

The tilt angle calculation module allows the watercraft to run at an appropriate tilt angle in response to the velocity as well as allowing the watercraft to run with a most efficient propulsion force for the operating conditions. The target propulsion force calculation module and the amount-of-operation calculation module allow the watercraft to be operated at a constant velocity regardless of changes in the weight of the watercraft or changes in the position of the center of gravity.

Since engine speed is included as a parameter of the amount-of-operation calculation, cavitation of the thrust generating device can be detected as an excessive engine speed rise, and the speed of the propulsion force is decreased to prevent cavitation.

Running of the watercraft at an appropriate trim angle is effected at all times without requiring an operator to adjust a trim switch. In particular, the trim angle is controlled without manual adjustment of the trim and regardless of the output of the outboard motor, the shape of the hull and the position of the center of gravity. These features enable the watercraft to be run at an efficient fuel consumption in response to the target velocity.

Velocity control allows the watercraft to be run at a desired velocity at all times. Further, turning can be performed easily without needing a manual throttling operation. Even if cavitation occurs, the cavitation can be suppressed promptly.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A running control device for a watercraft having a propulsion device that produces a controllable propulsion force and having a tilt angle adjusting device that controls a tilt angle of the propulsion device, the running control device comprising:
    a propulsion force control section that controls the propulsion force in response to at least a target velocity of the watercraft and a measured velocity of the watercraft, the propulsion force control section providing control signals to the propulsion device to control the propulsion force produced by the propulsion device to maintain the measured velocity of the watercraft at the target velocity; and
    a tilt angle control section that controls the tilt angle adjusting device to vary the tilt angle of the propulsion device, the tilt angle control section responsive to input information responsive to propulsion force produced by the propulsion device, the tilt angle control section varying the tilt angle of the propulsion device while monitoring the input information as the propulsion force control section controls the propulsion force of the propulsion device to maintain the measured velocity at the target velocity, the tilt angle control section selecting a value for the tilt angle that minimizes the propulsion force of the propulsion device while the propulsion device maintains the measured velocity at the target velocity.

2. The running control device according to claim 1, wherein the propulsion device comprises an outboard motor.

3. The running control device according to claim 2, wherein the tilt angle calculation module increases or decreases the angle at selected time intervals to minimize the speed of the outboard motor or to minimize fuel consumption of the outboard motor while the velocity is maintained at the target velocity by the propulsion force control section.

4. The running control device according to claim 1, wherein the tilt angle calculation module increases or decreases the tilt angle of the propulsion device at predetermined control time intervals to minimize the propulsion force or to minimize fuel consumption while the velocity is maintained at the target velocity by the propulsion force control section.

5. The running control device according to claim 1, wherein the propulsion force control section comprises:
    a target propulsion force calculation module that calculates a target propulsion force based on at least the target velocity of the watercraft and a measured velocity of the watercraft, the target propulsion force calculated to maintain the measured velocity of the watercraft at the target velocity of the watercraft; and
    an amount-of-operation calculation module that calculates an amount of operation of the propulsion device based on an actual propulsion force produced by the propulsion device and on the target propulsion force calculated by the target propulsion force calculation module, the amount of operation calculated to cause the propulsion device to maintain the actual propulsion force at the target propulsion force.

6. The running control device according to claim 5, wherein the target propulsion force calculation module is further responsive to a steering angle of the watercraft to reduce the calculated target propulsion force in response to an increase in steering angle.

7. The running control device according to claim 6, wherein the amount-of-operation calculation module is further responsive to the steering angle of the watercraft to increase the calculated amount of operation in response to an increase in the steering angle.

8. The running control device according to claim 5, wherein the amount-of-operation calculation module is further responsive to a steering angle of the watercraft to increase the calculated amount of operation in response to an increase in the steering angle.

9. The running control device according to claim 5, wherein the propulsion device comprises an outboard motor.

10. The running control device according to claim 9, wherein the tilt angle control section increases or decreases the tilt angle at selected time intervals to minimize the speed of the outboard motor or to minimize fuel consumption of the outboard motor while the propulsion force control section controls the speed of outboard motor to maintain the actual velocity of the watercraft at the target velocity of the watercraft.

11. The running control device according to claim 5, wherein the tilt angle control section increases or decreases the tilt angle at selected time intervals to minimize the propulsion force of the propulsion device or to minimize fuel consumption of the propulsion device while the propulsion force control section controls the propulsion device to maintain the actual velocity of the watercraft at the target velocity of the watercraft.

12. A running control device for a watercraft having an engine that generates a controllable engine output that produces a propulsion force and having a tilt angle adjusting device that controls an operational angle of the engine, the running control device comprising:

an engine output control section that generates control signals to control at least one engine control device, the engine output control section responsive to at least a target velocity for the watercraft and a measured velocity of the watercraft to generate the control signals to the engine control device to cause the engine to operate at an engine speed that produces a propulsion force that maintains the measured velocity at the target velocity; and a tilt angle control section that controls the operational angle of the engine, the tilt angle control section responsive to an input related to the propulsion force produced by the engine, the tilt angle control section varying the operational angle of the engine while monitoring the propulsion force of the engine as the control section controls the propulsion force of the engine to maintain the measured velocity at the target velocity, the tilt angle control section selecting a value for the operational angle of the engine that minimizes the propulsion force of the engine while the propulsion device maintains the measured velocity at the target velocity.

13. The running control device according to claim 12, wherein the at least one engine control device comprises at least one of an air intake control device, a fuel injection device and an ignition control device.

14. The running control device according to claim 12, wherein the tilt angle calculation module increases or decreases the operational angle of the engine at selected time intervals to minimize engine speed or to minimize fuel consumption while the measured velocity is maintained at the target velocity by the engine output control section.

15. The running control device according to claim 12, wherein the engine output control section generates signals to control the at least one engine speed control device to control the engine output based on at least the target velocity of the watercraft, the measured velocity of the watercraft and an actual engine speed, the engine output control section comprising:

a target engine speed calculation module that calculates a new target engine speed based on a current target engine speed and based on a calculated change in target engine speed, the calculated change in target engine speed responsive to at least the measured velocity and the target velocity; and an amount-of-operation calculation module that calculates an amount of operation of the at least one engine speed control device based on a difference between the target engine speed and the currant engine speed, the amount of operation of the at least one engine speed control device outputting a signal that causes the actual engine speed to vary by an amount to reduce the difference between the actual engine speed and the target engine speed calculated by the target engine speed calculation module.

16. The running control device according to claim 15, wherein the target engine speed calculation module is further responsive to a steering angle of the watercraft to reduce the calculated change in target engine speed in response to an increase in the steering angle.

17. The running control device according to claim 16, wherein the amount-of-operation calculation module is further responsive to the steering angle of the watercraft to increase the calculated amount of operation in response to an increase in the steering angle.

18. The running control device according to claim 15, wherein the amount-of-operation calculation module is further responsive to a steering angle of the watercraft to increase the calculated amount of operation in response to an increase in the steering angle.

19. The running control device according to claim 15, wherein the tilt angle calculation module increases or decreases the operational angle of the engine at selected time intervals to minimize engine speed or to minimize fuel consumption while the actual velocity of the watercraft is maintained at the target velocity by the engine output control section.

20. A method for controlling the propulsion force and the tilt angle of a propulsion generating device on a watercraft, the method comprising:

calculating a target propulsion force based on at least a target velocity of the watercraft, a measured velocity of the watercraft and a steering operation of the watercraft;

calculating an amount of operation of the propulsion device based on the calculated target propulsion force, an actual propulsion force and the steering operation of the watercraft, the amount of operation calculated to cause the propulsion device to produce the target propulsion force; and controlling the tilt angle of the propulsion device to minimize the propulsion force required to maintain the measured velocity of the watercraft at the target velocity of the watercraft.

21. The method according to claim 20, further comprising increasing or decreasing the tilt angle at selected time intervals to minimize the propulsion force or to minimize fuel consumption of the propulsion device while the actual velocity of the watercraft is maintained at the target velocity by controlling the propulsion force.

22. A method for controlling an engine speed and an operational angle of a outboard motor on a watercraft, the method comprising:

calculating a target engine speed in response to at least an actual velocity of the watercraft, a target velocity of the watercraft, and a steering angle of the watercraft;

calculating an amount of operation required to operate the engine at the calculated target engine speed at the steering angle of the watercraft;

generating signals responsive to the calculated amount of operation to electrically control at least one engine control device to produce the calculated amount of operation;

controlling the operational angle of the engine while maintaining the actual velocity of the watercraft at the target velocity of the watercraft to determine a minimal engine speed and a corresponding operational angle required to maintain the actual velocity at the target velocity; and maintaining the corresponding operational angle while the actual velocity is maintained at the target velocity.

23. The method according to claim 22, further comprising increasing or decreasing the operational angle at selected time intervals to minimize the engine speed while the actual velocity of the watercraft is maintained at the target velocity to thereby minimize fuel consumption.

* * * * *

UNITED STATES PATENT AND TRADEMARK OFFICE
CERTIFICATE OF CORRECTION

PATENT NO. : 6,997,763 B2 Page 1 of 1
APPLICATION NO. : 10/273776
DATED : February 14, 2006
INVENTOR(S) : Hirotaka Kaji It is certified that error appears in the above-identified patent and that said Letters Patent is hereby corrected as shown below:

At column 1, line 21, please delete "stem" and insert -- stern --, therefore.

At column 1, line 67, please delete "5,167,456." and insert -- 5,167,546. --, therefore.

At column 13, line 49, in claim 15, please delete "currant" and insert -- current --, therefore.

Signed and Sealed this

Fourteenth Day of August, 2007

JON W. DUDAS
*Director of the United States Patent and Trademark Office*